United States Patent
Yang et al.

(10) Patent No.: US 8,212,692 B2
(45) Date of Patent: Jul. 3, 2012

(54) MANUAL PULSE GENERATOR WITH TOUCH SENSOR INPUTS

(75) Inventors: Ching-Cheng Yang, Taipei Hsien (TW); Jhy-Hau Chiu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 776 days.

(21) Appl. No.: 12/166,258

(22) Filed: Jul. 1, 2008

(65) Prior Publication Data

US 2009/0256725 A1    Oct. 15, 2009

(30) Foreign Application Priority Data

Apr. 14, 2008  (CN) .......................... 2008 1 0301125

(51) Int. Cl.
*H03K 17/94*  (2006.01)
*H03K 17/955* (2006.01)
(52) U.S. Cl. ........................................... 341/20; 341/33
(58) Field of Classification Search .................... 341/20, 341/33
See application file for complete search history.

(56) References Cited

U.S. PATENT DOCUMENTS

| | | | | |
|---|---|---|---|---|
| 5,247,295 | A * | 9/1993 | Kanda ........................ | 340/12.18 |
| 5,880,718 | A * | 3/1999 | Frindle et al. ................ | 345/174 |
| 7,906,875 | B2 * | 3/2011 | Caldwell et al. .............. | 307/139 |
| 2005/0027398 | A1 * | 2/2005 | Tokutake et al. ............. | 700/245 |
| 2005/0283275 | A1 * | 12/2005 | Tokutake et al. ............. | 700/264 |
| 2009/0261990 | A1 * | 10/2009 | Wu et al. ......................... | 341/20 |
| 2010/0033168 | A1 * | 2/2010 | Yu et al. .................... | 324/207.13 |
| 2010/0069129 | A1 * | 3/2010 | Iio et al. ..................... | 455/575.3 |
| 2010/0175932 | A1 * | 7/2010 | Wu ............................. | 178/18.06 |

* cited by examiner

*Primary Examiner* — Adi Amrany
(74) *Attorney, Agent, or Firm* — Altis Law Group, Inc.

(57) ABSTRACT

A manual pulse generator that includes a main body, a magnification selector, an axis selector, and an input device is disclosed. The input device is disposed on an upper surface of the main body. The input device includes a control chip and a panel with many touch-sensors electronically connected to the control chip. When the touch-sensors are touched, the touch-sensors generate signals to the control chip. The control chip is configured to generate pulse signals according to the signals received from the touch-sensors to control a servo motor of a CNC machine.

11 Claims, 7 Drawing Sheets

MANUAL PULSE GENERATOR WITH TOUCH SENSOR INPUTS

BACKGROUND

1. Field of the Invention

The invention generally relates to manual pulse generators, and particularly to a manual pulse generator used in a computer numerical control machine.

2. Description of Related Art

A manual pulse generator is a device normally associated with a computer numerical control (CNC) machine or other devices involved in positioning. The manual pulse generator generates electrical pulses that are sent to a controller of a CNC machine. The controller then moves a controllable part of the machine a predetermined distance for each pulse. Referring to FIG. 1, a typical manual pulse generator according to the prior art includes a main body 1 and a rotor 2 mounted on an upper surface of the main body 1. Because the rotor 2 and other objects makes the manual pulse generation relatively big and heavy, the manual pulse generator cannot be held for a long time with ease by a user. Furthermore, using the rotor can only generate pulses signal for the control along one axis, which is inefficient.

DETAILED DESCRIPTION

Figure 1:
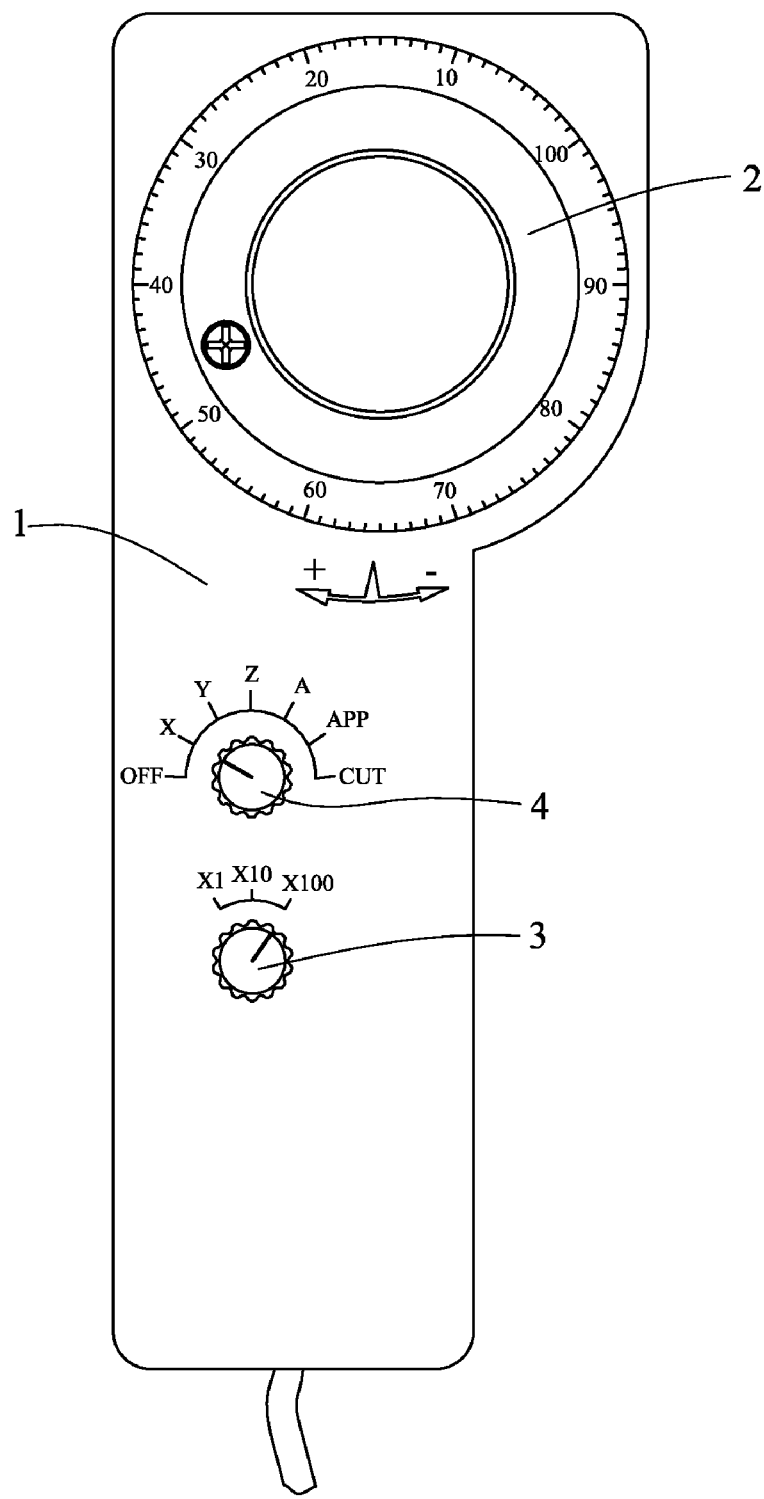
FIG. 1 is a schematic view of a conventional manual pulse generator according to the prior art.
Figure 2:
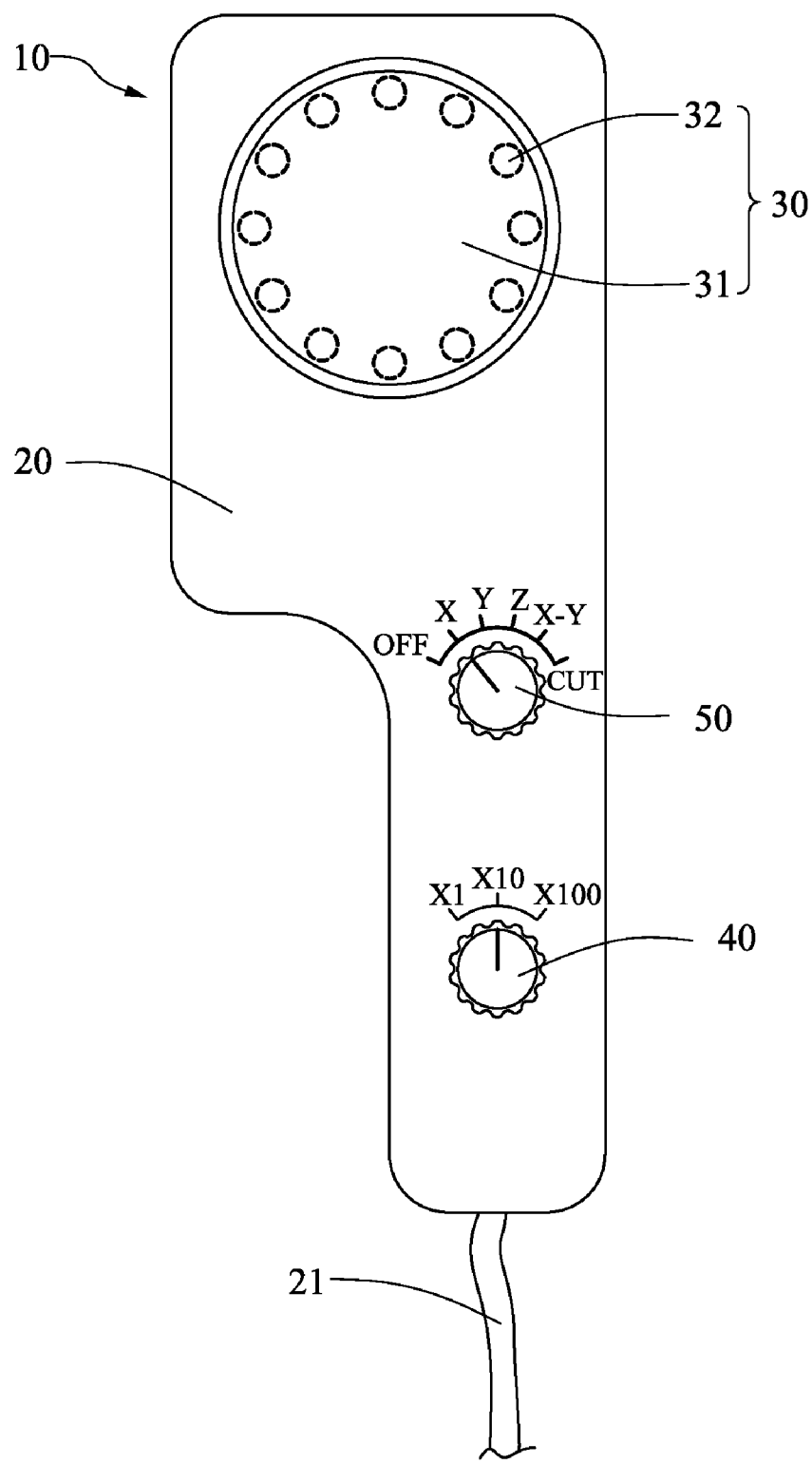
FIG. 2 is a schematic view of a manual pulse generator in accordance with a first embodiment of the present invention.

Referring to FIG. 2, a manual pulse generator 10 in accordance with a first embodiment of the present invention includes a main body 20, an input device 30, a magnification selector 40, and an axis selector 50. The input device 30, the magnification selector 40, and the axis selector 50 are disposed on an upper surface of the main body 20.

The main body 20 is substantially rectangular shape, and can be held by a user when in use. A cable 21 is needed to connect the main body 20 to a controller of a CNC machine (not shown in FIG. 2).

Figure 3:
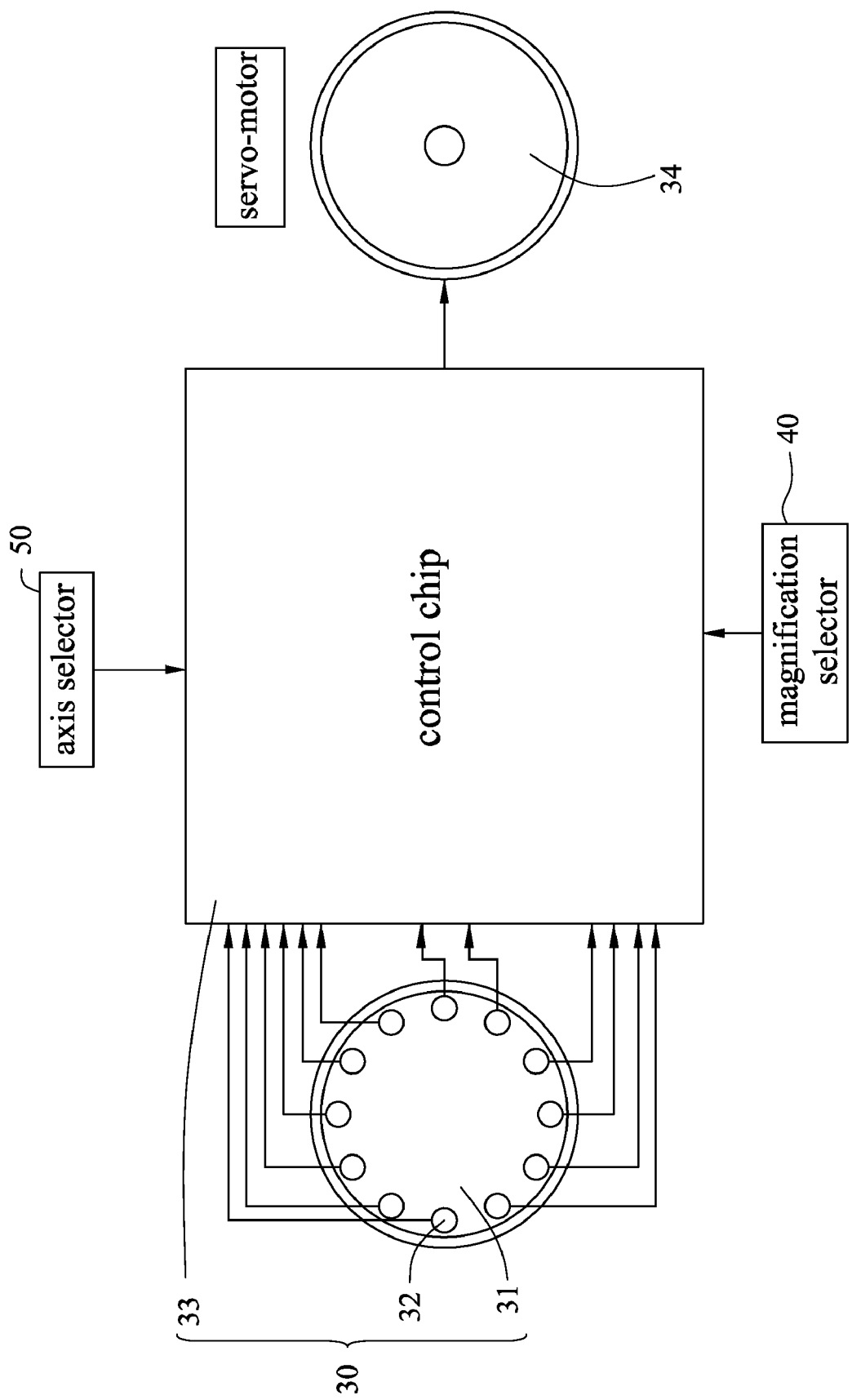
FIG. 3 is a block diagram of the manual pulse generator of FIG. 2.

Referring to FIG. 3, the input device 30 includes a control chip 33 and a panel 31 with many touch-sensors 32 electronically connected to the control chip 33. The panel 31 is disposed on an upper surface of the main body 20. The touch-sensors 32 generate a signal when touched by an electrical conductor. In the first embodiment, the panel 31 is substantially spherical in shape, the touch-sensors 32 are capacitive sensing devices, and the touch-sensors 32 are disposed on the circumference of the panel 31.

The control chip 33 is configured to receive signals from the touch-sensors 32 and processing the sequence of signals to ascertain the direction of the pulse signals. Then, the control chip 33 generates pulse signals according to the number of signals to control one or more servo-motors of the CNC machine.

The magnification selector 40 is connected to the control chip 33. The magnification selector 40 is configured to select magnification factors of the pulses to be output from the manual pulse generator. The axis selector 50 is electronically connected to the control chip 33. The axis selector 80 is configured to choose a drive axis in the CNC machine to be controlled by the manual pulse generator 10.

It should be noted that the input device 30 is used instead of a typical rotor. Users can hold the manual pulse generator 10 for a long time, because the manual pulse generator 10 is small and light when compared to the prior art.

Figure 4:
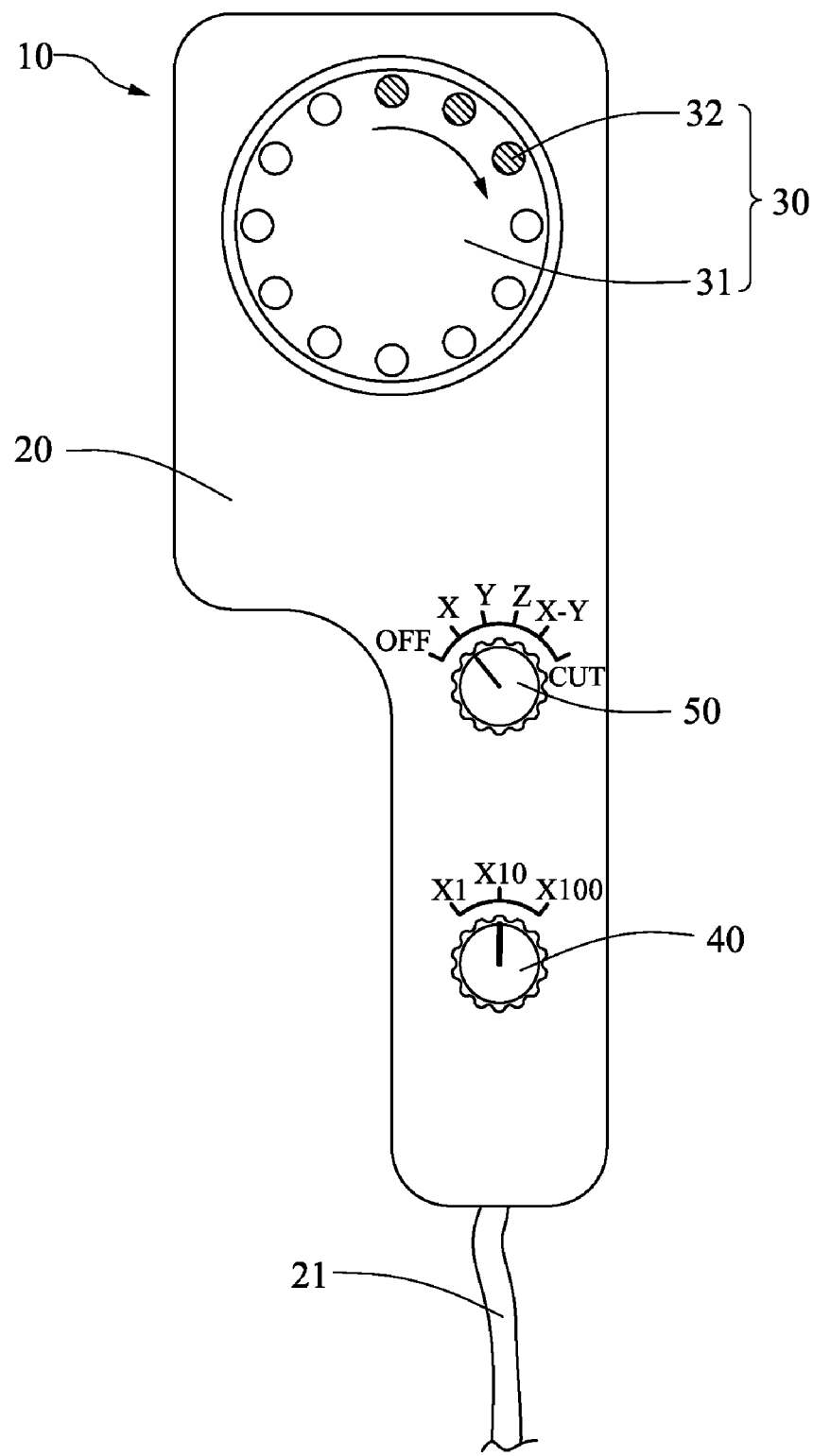
FIGS. 4 to 6 respectively show schematic views of the manual pulse generator of FIG. 2 in different use states.

Referring to FIG. 4, when a (not shown in FIG. 4) user touches the touch-sensors 32 of the panel 31 in a clockwise motion, the touch-sensors 32 each generate a signal in sequence corresponding to the touch. The control chip 33 is configured to receive signals from the touch-sensors 32 and process the signals to generate positive pulse signals to control one of the servo-motors of the CNC machine.

Figure 5:
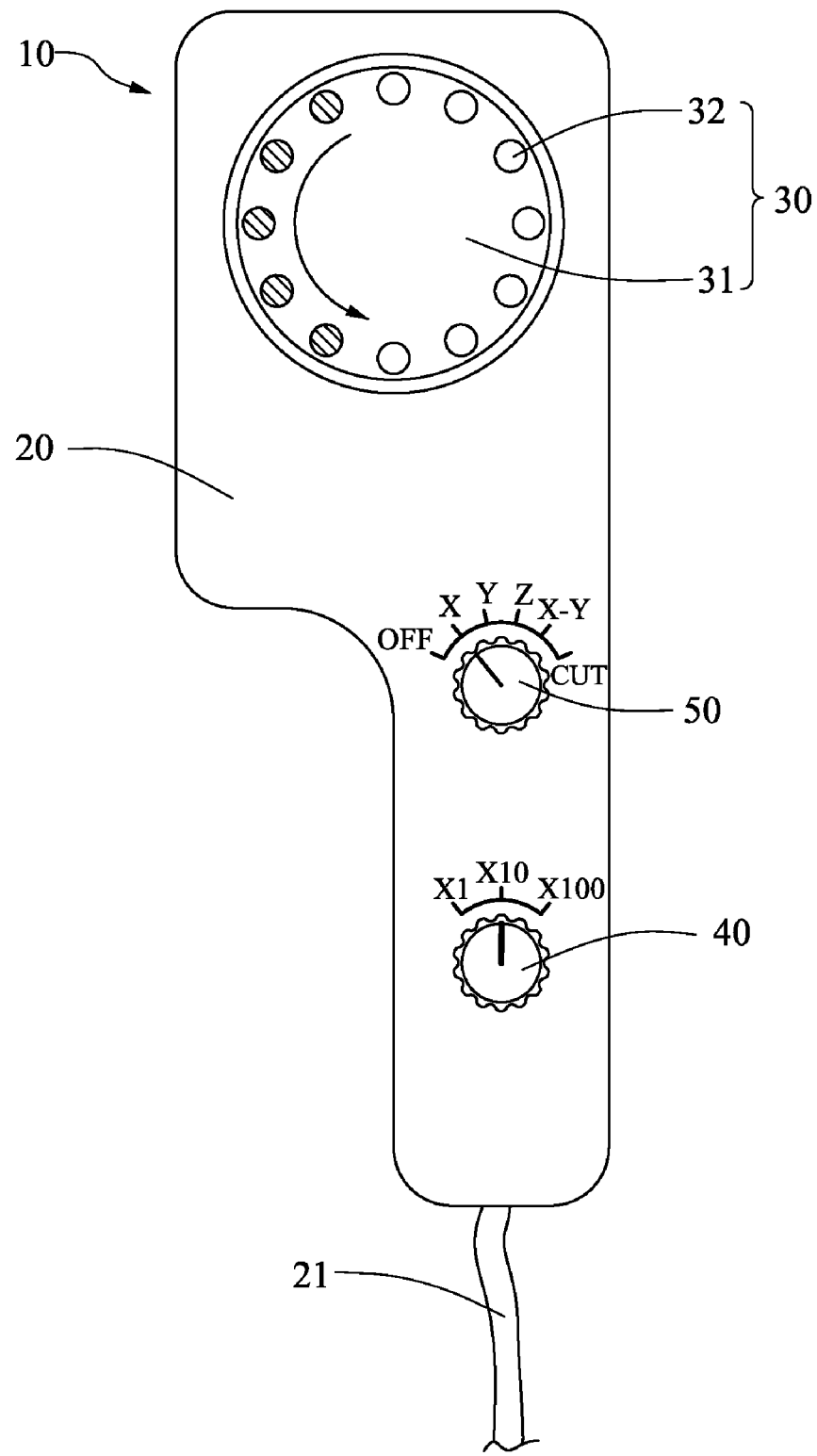

Referring to FIG. 5, when the user touches the touch-sensors 32 using a counter-clockwise motion, the touch-sensors 32 generate signals in sequence corresponding to the motion. The control chip 33 is configured to receive the signals indicating a counter-clockwise motion from the touch-sensors 32 and processing the signals to generate negative pulse signals to control one of the servo-motors of the CNC machine.

Figure 6:
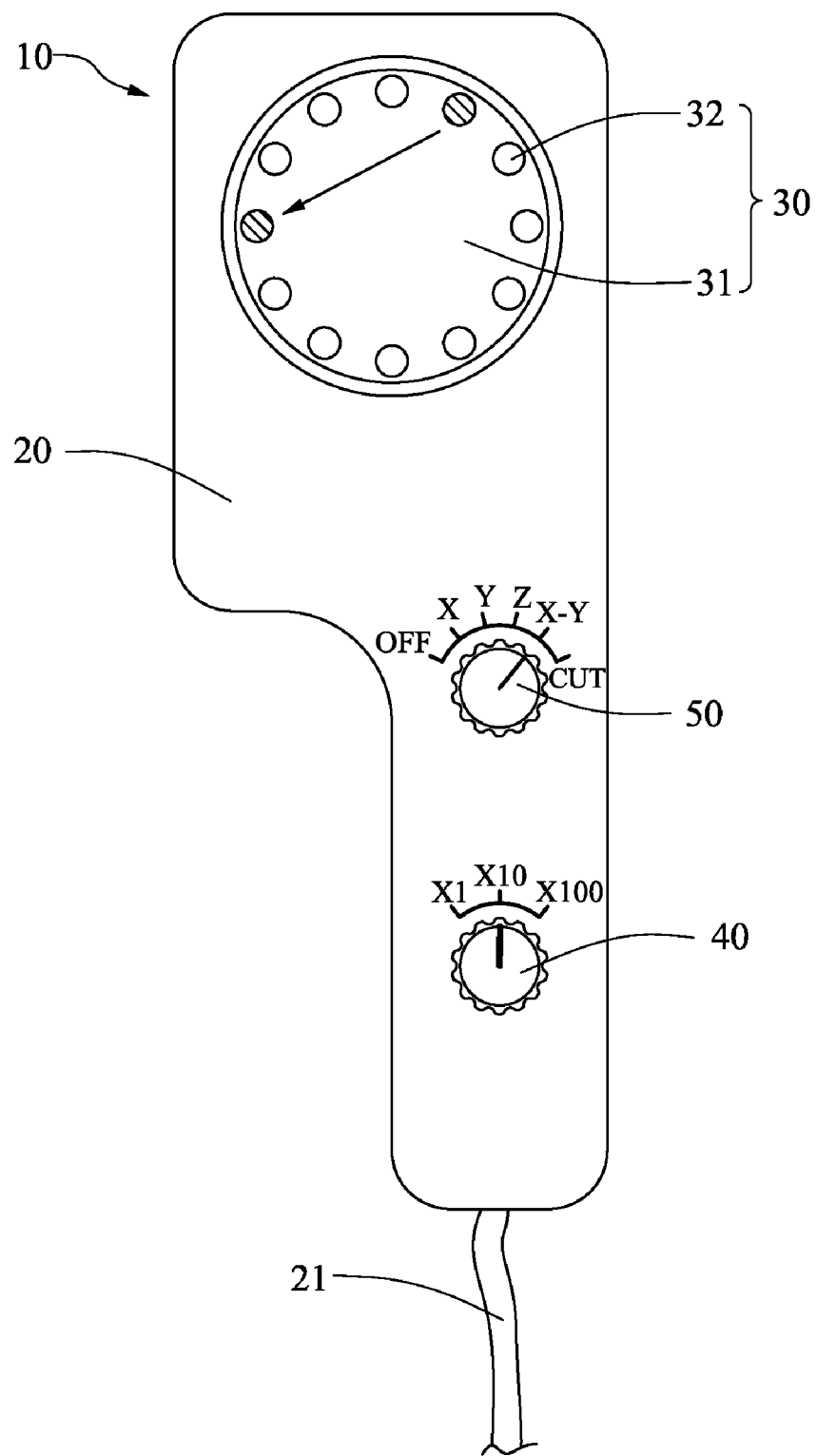

Referring to FIG. 6, if the axis selector 50 is positioned to select a multi-axis mode, then signals generated by a touch to the touch-sensors 32 of the panel 31 are parsed by the control chip 33 to determine desired direction and angle of motion of two drive axes of the CNC machine. The control chip 33 does this by using vector analysis applied to a conjunctional line of two touched touch-sensors and then generates a pulse signal and dividing the pulse signal into two parts accordingly. The two parts to be output to control two servo-motors of the CNC machine at the same time. The operation efficiency of the manual pulse generator is thus greatly improved.

Figure 7:
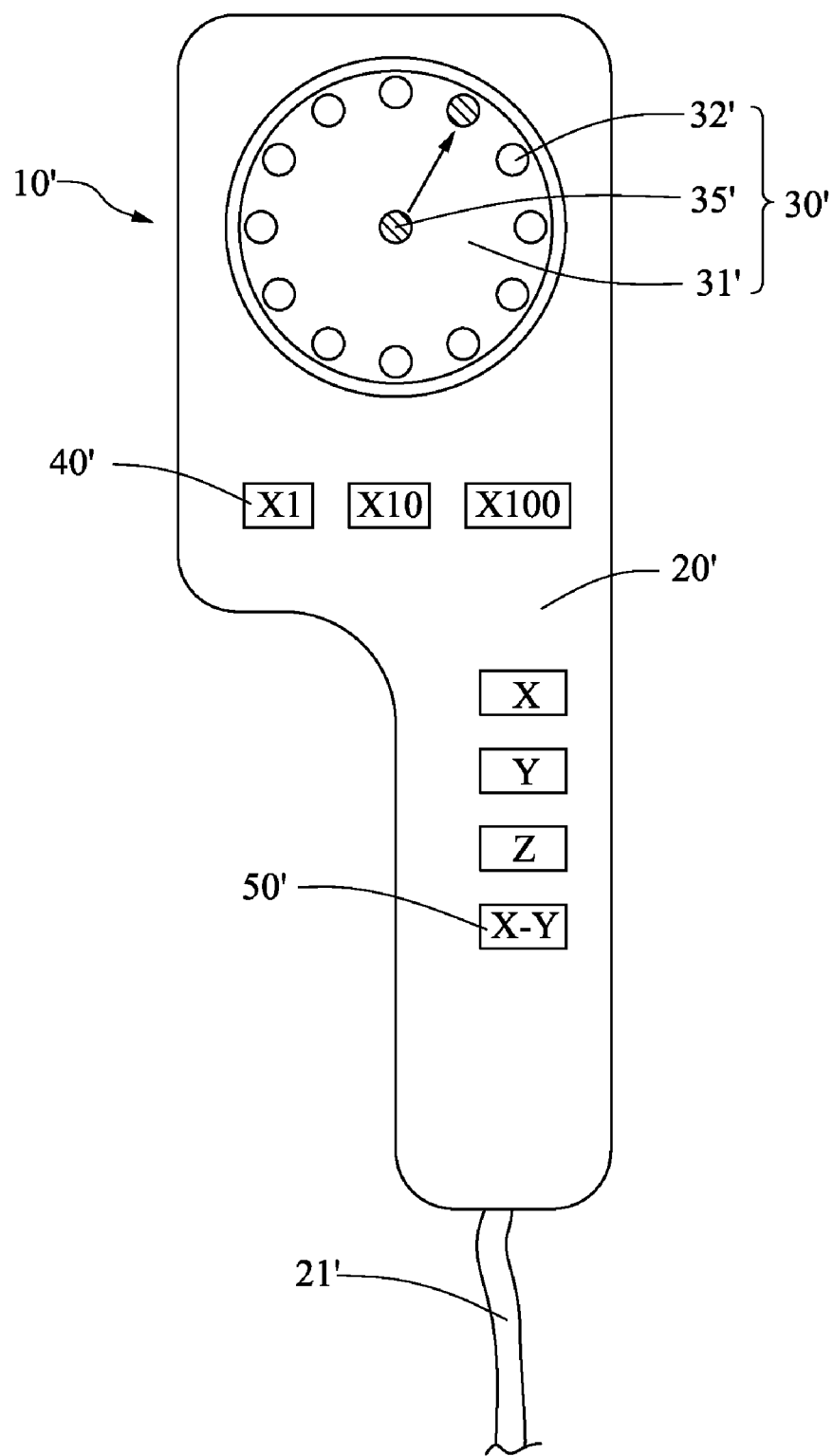
FIG. 7 is a schematic view of a manual pulse generator in accordance with a second embodiment of the present invention.

Referring to FIG. 7, a manual pulse generator 20' of a second embodiment of the present invention is illustrated. In this embodiment, a touch-sensor 35' is disposed on the center of the panel 31' and the magnification selector 40' and axis selector 50' are capacitive sensing devices. When the user touches a combination of one or more of the touch-sensors 32' and the touch sensor 35' of the panel 31', the multi-axis mode previously described is selected, and signals generated accordingly. The number and position of the touch-sensors can be set according to need.

In the second embodiment of the present invention, the magnification selector 40' and axis selector 50' both are capacitive sensing devices.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A manual pulse generator for controlling a machine, comprising:

a main body; and an input device disposed on the main body, the input device comprising a control chip and at least two touch-sensors electrically connected to the control chip; each touch-sensor generating a signal to the control chip when being touched;

wherein when two of the at least two touch sensors are touched in sequence, the signals generated by the touched touch-sensors are parsed by the control chip into a first axis signal and a second axis signal to control the machine to move in a first rectilinear direction and a second rectilinear direction different from the first rectilinear direction, respectively.

2. The manual pulse generator as claimed in claim 1, wherein the first axis signal and the second axis signal control a first servo motor and a second servo motor of the machine, respectively.

3. The manual pulse generator as claimed in claim 2, wherein the first servo motor and the second servo motor control a first drive axle and a second drive axle of the machine, respectively; the first drive axle drives the machine to move in the first rectilinear direction, and the second drive axle drives the machine to move in the second rectilinear direction.

4. The manual pulse generator as claimed in claim 1, wherein a magnification selector is arranged on the main body to be selected between a single-axis mode and a multi-axis mode; the signals generated by the touched touch-sensors are parsed into the first axis signal and the second axis signal when the multi-axis mode is selected.

5. The manual pulse generator as claimed in claim 1, wherein the control chip parses the signals generated by the touched touch-sensors into the first axis signal and the second axis signal using vector analysis applied to a conjunctional line of the two touched touch-sensors.

6. The manual pulse generator as claimed in claim 1 wherein the first axis signal and the second signal are outputted to the machine simultaneously.

7. The manual pulse generator as claimed in claim 1, wherein the at least two touch-sensors are arranged around a circumference, and the two touched touch-sensors are not adjacent to each other.

8. The manual pulse generator as claimed in claim 1, wherein one of the at least two touch-sensors is arranged in center of a circle, and the other of the at least two touch-sensors are arranged around a circumference of the circle; one of the two touched touch-sensors are the touch-sensor arranged in the center of the circle.

9. The manual pulse generator as claimed in claim 1, wherein the at least two touch-sensors are capacitive touch-sensors.

10. The manual pulse generator as claimed in claim 1, wherein a signal cable is connected between the main body and the machine to transmit the first axis signal and the second axis signal to the machine.

11. The manual pulse generator as claimed in claim 1, wherein the machine is a computer numerical control (CNC) machine.

* * * * *